United States Patent Office 3,053,877
Patented Sept. 11, 1962

3,053,877
ORGANIC PHOSPHORUS COMPOUNDS
Gail H. Birum, Dayton, Ohio, and James L. Dever, Arlington, Mass., assignors to Monsanto Chemical Company, St. Louis, Mo., a corporation of Delaware
No Drawing. Filed Nov. 25, 1960, Ser. No. 71,420
8 Claims. (Cl. 260—461)

This invention relates to organic phosphorus compounds. More particularly, this invention relates to a process for preparing certain phosphinyloxyalkenyl esters of pentavalent phosphorus compounds.

It is an object of this invention to provide a process for preparing valuable organic phosphorus compounds. It is another object of this invention to provide a new process for preparing certain phosphinyloxyalkenyl esters of pentavalent phosphorus acids. Other objects and advantages will become apparent from the description given below.

In general, this invention is directed to a process for preparing phosphinyloxyalkenyl esters of pentavalent phosphorus acids by reacting an α-halo-β-oxohydrocarbyl ester of a pentavalent phosphorus acid with a trivalent phosphorus ester having at least one alkoxy or haloalkoxy radical bonded to the trivalent phosphorus atom.

More specifically, the process of this invention may be described as one involving the following general equation:

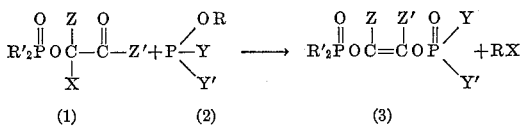

wherein each R' radical is selected from the group consisting of hydrocarbyl, hydrocarbyloxy, halohydrocarbyl, and halohydrocarbyloxy radicals which are free from aliphatic unsaturation and have from one to twelve carbon atoms; X is selected from the group consisting of bromine and chlorine; Z is selected from the group consisting of hydrocarbyl radicals which are free from aliphatic unsaturation and have from one to twelve carbon atoms, and said hydrocarbyl radicals having alkoxy groups of from one to two carbon atoms substituted therein; Z' is selected from the group consisting of hydrocarbyl radicals which are free from aliphatic unsaturation and have from one to twelve carbon atoms, said hydrocarbyl radicals having alkoxy groups of from one to two carbon atoms as substituents therein, and hydrogen; R is selected from the group consisting of alkyl and haloalkyl radicals having from one to twelve carbon atoms; Y and Y' are each selected from the group consisting of hydrocarbyl, hydrocarbyloxy, and halohydrocarbyloxy radicals which are free from aliphatic unsaturation and have from one to twelve carbon atoms.

The α-halo-β-oxohydrocarbyl esters of pentavalent phosphorus acids depicted by Formula 1 above, which are the starting materials for use in the process of this invention, may be prepared by the reaction of bromine or chlorine with a 1:1 adduct of a trivalent phosphorus ester having at least one alkoxy or haloalkoxy radical of from one to twelve carbon atoms bonded to the phosphorus atom and an α-dicarbonyl compound according to the following general equation:

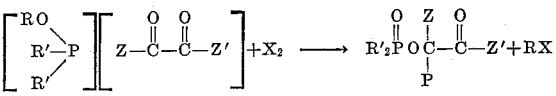

wherein the formulas in brackets indicate the 1:1 adduct of the trivalent phosphorus ester and the α-dicarbonyl compound, and wherein R, R', Z, Z', and X are as defined above. A few examples of such α-halo-β-oxohydrocarbyl esters which may be used are:

1-bromo-1-methyl-2-oxopropyl dimethyl phosphate,
1-chloro-1,2-diphenyl-2-oxoethyl butyl dodecyl phosphate,
1-bromo-1-nonyl-2-oxoundecyl bis(2-chloropropyl)phosphate,
1-chloro-1-hexyl-2-oxooctyl ethyl phenylphosphonate,
1-chloro-1-propyl-2-oxopentyl 2-ethylhexyl-2-ethylhexylphosphonate,
1-chloro-1-ethyl-2-oxobutyl ethyl ethylphosphonate,
1-bromo-1,2-diphenyl-2-oxoethyl 2-chloroethyl 2-chloroethylphosphonate,
1-chloro-2-oxo-1,2-bis(2,4-xylyl)ethyl dibenzylphosphinate,
1-bromo-2-oxo-1,2-bis[(cyclohexyl)methyl]ethyl dipropylphosphinate, and
1-chloro-2-oxo-1,2-bis(phenylmethyl)ethyl propylethylphosphinate.

When Z and Z' are different radicals, the α-halo-β-oxohydrocarbyl phosphorus esters are mixtures of those having Z attached to the α-carbon having the halogen atom, and Z' being attached to the β-carbon of the hydrocarbyl group, and those wherein Z' is attached to the α-carbon and Z attached to the β-carbon. Examples of such compounds are:

1-bromo-1-phenyl-2-oxopropyl di-n-octyl phosphate, and 1-bromo-1-methyl-2-phenyl-2-oxoethyl di-n-octyl phosphate, and mixtures thereof,
1-chloro-1-phenyl-2-oxoethyl butyl phenyl phosphate, and 1-chloro-2-phenyl-2-oxoethyl butyl phenyl phosphate, and mixtures thereof,
1-bromo-1-[4-(β-naphthyl)butyl]-2-oxoundecyl n-amyl n-amylphosphonate, and 1-bromo-1-nonyl-2-[4-(β-naphthyl)butyl]-2-oxoethyl n-amyl n-amylphosphonate, and mixtures thereof,
1-chloro-1-p-methoxyphenyl-2-oxoethyl cyclopentyl phenylphosphonate, and 1-chloro-2-p-methoxyphenyl-2-oxoethyl cyclopentyl phenylphosphonate, and mixtures thereof,
1-chloro-1-isopropyl-2-phenyl-2-oxoethyl methyl phenylphosphonate, and 1-chloro-1-phenyl-3-methyl-2-oxobutyl methyl phenylphosphinate, and mixtuers thereof,
1-chloro-1-(p-tolyl)-3,3-dimethyl-2-oxobutyl bis(p-tolyl)-phosphinate, and 1-chloro-1-(t-butyl)-2-(p-tolyl)-2-oxomethyl bis(p-tolyl)phosphinate, and mixtures thereof.

The α-halo-β-oxohydrocarbyl esters of pentavalent phosphorus acids which are used as the starting materials for this invention are the subject matter of applicants' copending patent application S.N. 828,679, filed July 22, 1959, which is incorporated herein by reference.

Trivalent phosphorus esters useful according to the process of this invention are those having at least one alkoxy or haloalkoxy radical bonded to the trivalent phosphorus atom. Remaining valences of the trivalent phosphorus atom of the ester may be satisfied by the radicals defined by Y and Y' above. An especially useful class of such trivalent phosphorus esters are the phosphite triesters having at least one alkoxy or haloalkoxy radical bonded to the trivalent phosphorus atom. Examples of such esters are: trimethyl, triethyl, tris(2-chloroethyl), triisopropyl, tris(3,4-dichlorobutyl), tris(3-chloro-2-bromopropyl), tri-n-amyl, tri-n-hexyl, tris(2-ethylhexyl), trinonyl, tridodecyl, 3-bromopropyl diethyl, dimethyl ethyl, butyl diethyl, 6-iodohexyl dipropyl, amyl dioctyl, ethyl methyl propyl, butyl 2-iodoethyl phenyl, ethyl diphenyl, 2-bromopropyl bis(4-chlorophenyl), octyl bis(p-tolyl), undecyl bis(o-ethylphenyl), heptyl dibenzyl, dimethyl pentachlorophenyl, ethyl dinaphthyl, dibutyl phenyl, di-p-tolyl, 2-fluoroethyl, tricyclohexyl, 2-chloroethyl dibiphenylyl, tris(4-methylcyclohexyl), and amyl cyclopentyl phenyl phosphites.

Esters of phosphonous acids having at least one alkoxy or haloalkoxy radical bonded to the phosphorus atom are included within the group of esters useful for preparing the phosphinyloxyalkenyl esters. Such esters are, for example: ethyl phenyl phenylphosphonite, diethyl butylphosphonite, 2-chloroethyl 2-ethylhexyl β-naphthylphosphonite, 4-bromo-butyl butyl p-tolylphosphonite, 2-ethylhexyl cyclohexyl dodecylphosphonite, propyl phenyl ethylphosphonite, bis(2,3 - dichlorooctyl) phenylphosphonite, butyl α-naphthyl cyclopentylphosphonite, and 4-chlorocyclohexyl phenyl diphenylylphosphonite.

Esters of phosphinous acid, wherein the one ester radical in the compound is selected from the group consisting of alkoxy and haloalkoxy radicals having from one to twelve carbon atoms, likewise may be used in the process of this invention. Examples of phosphinites useful for this purpose are: methyl dimethylphosphinite, 2-chlorohexyl didodecylphosphinite, butyl diphenylphosphinite, ethyl (ethyl)naphthylphosphinite, cyclohexyl diphenylphosphinite, octyl dibiphenylylphosphinite.

Examples of products obtained according to the process of this invention when an α-halo-β-oxohydrocarbyl ester of a pentavalent phosphorus acid compound of the above defined type is reacted with a phosphite ester are:

2-(dimethoxyphosphinyloxy)-1-methylpropen-1-yl dimethyl phosphate,
2[bis(2-ethylhexyloxy)phosphinyloxy]-1-butylhexen-1-yl bis(2-bromoethyl) phosphate,
2-[(4-bromohexyloxy)ethoxyphosphinyloxy]-1-dodecyl-tetradecen-1-yl dinaphthyl phosphate, and
2-(cyclopentenyloxynonyloxyphosphinyloxy)-1-propyl-pepten-1-yl bis(4-bromobutyl) phosphate.

Other examples of this type include:

2-[bis(2-chloropropoxy)phosphinyloxy]-1,2-dinaphthyl-ethenyl cyclohexyl phenylphosphonate,
2-[(2-bromohexyloxy)propoxyphosphinyloxy]-1,2-bis-(6-methoxyhexyl)ethenyl 2-chlorophenyl 2-chlorophenylphosphonate,
2-(ethoxyphenoxyphosphinyloxy)-1-hexylocten-1-yl diphenylphosphinate, and
2-[bis(2,4,5-trichlorophenoxy)phosphinyloxy]-1-(4-ethoxybutyl)-6-ethoxyhexen-1-yl didodecylphosphinate.

When Z and Z′ are different radicals the product obtained is an isomeric mixture of products wherein Z is on the α-carbon and Z′ is on the β-carbon and compounds wherein Z′ is on the α-carbon and Z is on the β-carbon. Examples of such compounds are:

2-[bis(10,11-dichlorododecyloxy)phosphinyloxy]-1-ethylocten-1-yl ethyl phenylphosphonate, and its isomer 2-[bis(10,11-dichlorododecyloxy)phosphinyloxy]-1-hexyl-2-buten-1-yl ethyl phenylphosphonate,
2-[bis(2-iodopropoxy)phosphinyloxy]-1-cyclopentylethenyl phenyl 2-chloropropyl phosphate and its isomer 2-[bis(2-iodopropoxy)phosphinyloxy]-2-cyclopentyl-ethenyl phenyl 2-chloropropyl phosphate.

Examples of products obtained according to the process of this invention when an α-halo-β-oxohydrocarbyl ester of a pentavalent phosphorus acid of the above defined type is reacted with a phosphonite ester are:

2-(ethoxyphenylphosphinyloxy)-1-butylhexen-1-yl bis-(2-chloroethyl) phosphate,
2-[(2-bromoethoxy)benzylphosphinyloxy]-1-methylpropen-1-yl phenyl phenylphosphonate,
2-[(cyclopentyloxy)ethylphosphinyloxy]-1,2-dinaphthyl-ethenyl pentachlorophenyl phenylphosphonate,
2-(hexyloxyhexylphosphinyloxy)-1-hexylocten-1-yl diphenylphosphinate, and
2-naphthyloxypropylphosphinyloxy)-1,2-(bis-p-methoxyphenyl)-ethenyl dihexylphosphinate.

Examples of products obtained according to the process of this invention when an α-halo-β-oxohydrocarbyl ester of a pentavalent phosphorus acid of the above defined type is reacted with a phosphinite ester are:

2-(diphenylphosphinyloxy) - 1 - methylpropen-1-yl bis(2-chloropropyl) phosphate,
2-[ethyl(p-cumy)phosphinyloxy]-1-butylhexen-1-yl ethyl phenylphosphonate,
2-(cyclohexylphenylphosphinyloxy)-1,2-dicyclohexyl-ethenyl 4-chlorobutyl butylphosphonate,
2-(dihexylphosphinyloxy)-1-propylpenten-1-yl dihexyl-phosphinate, and
2-(propylphenylphosphinyloxy)-1,2-diphenylethenyl di-p-tolyl phosphate.

Reaction of the α-halo-β-oxohydrocarbyl ester of the pentavalent phosphorus acid and the trivalent phosphorus ester takes place by mixing together the reactant in the above indicated proportions at temperatures on the order of from 50° C. to 170° C., preferably 70° C. to 140° C. The reactants may be mixed and warmed until the reaction temperature is reached or one reactant may be warmed to the reaction temperature and then the other added. General mixing of the reactants is usually recommended in order to obtain smooth reaction. Completion of the reaction can be readily ascertained by noting cessation in change of viscosity, refractive index, or by the quantity of alkyl or haloalkyl halide produced. In some cases, it may be desirable to heat the reactants under reduced pressures to remove the alkyl halide byproduct as formed and thus minimize the possibility of deleterious side reactions.

Stoichiometric proportions are advantageously employed in that thereby good yields of desired products result and there arises substantially no problem of separating any excess reactant. However, excess amounts of the trivalent phopshorus ester or α-halo-β-oxohydrocarbyl ester may be employed. In such cases, the excess reactant can be removed if a pure product is desired. Although optimum procedure calls for adding a trivalent phosphorus ester to the α-halo-β-hydrocarbyl ester, the two reactants may be added simultaneously to the reaction vessel, or the α-halo-β-oxohydrocarbyl ester may be added to the trivalent phosphorus ester reactant.

The process of the present invention is readily conducted in the absence of an inert diluent or catalyst, however, catalyst and diluents or solvents may be employed; such diluents may be those, for example, having a boiling point within the range of 80° to 160° C., such as benzene, toluene, xylene, and chlorobenzene. Employing no diluent and using substantially the stoichiometric proportions of reactants, the reaction product which consists essentially of the (phosphinyloxy)alkenyl derivative of the pentavalent acid dissolved in the halogenated alkane which is produced as a by-product of the reaction may be used directly for a variety of industrial and agricultural purposes without purification.

The compounds provided by the process of this invention are stable, usually high-boiling materials which range from viscid liquids to waxy or crystalline solids. They are useful as biological toxicants; for example, insecticides, fungicides, nematocides, bacteriostats; as lubricant and gasoline additives; as functional fluids, for example, in force transmission media and in dielectric applications; as plasticizers for synthetic resins and plastics, and as rubber compound chemicals. They are also useful as antioxidants and as pharmaceuticals. The compounds prepared by the method of this invention, especially those which contain bromine and/or chlorine, are particularly useful as fire retardant or flameproofing chemicals. They are especially valuable in organic compositions. They are valuable as additives to polyurethane and polystyrene foams and other synthetic polymer compositions as well as cellulosic and carbonaceous combustible materials, for example, surface coatings, lacquers, polymers, resins, adhesives, and sealing compositions.

The following examples illustrate the invention but are not to be construed as limiting:

Example 1

This example illustrates the preparation of the α-chloro-β-oxohydrocarbyl esters of the pentavalent phosphorus compounds used as starting materials for this invention and the products obtained according to the process of this invention.

*Step 1.*—To a reaction vessel containing 124.1 g. (1.0 mole) of trimethyl phosphite there was added 86.1 g. (1.0 mole) of 2,3-butanedione in 0.5 hour at 30–40° C., using cooling when necessary. The mixture was stirred until no further reaction was apparent and then warmed to 60° C. to insure complete reaction.

*Step 2.*—To the adduct prepared above was added 70.9 g. (1.0 mole) of chlorine with cooling at 30–40° C. The product was then concentrated to 85° C./0.25 mm.

*Step 3.*—To the above prepared 1-chloro-1-methyl-2-oxopropyl dimethyl phosphate there was added 166.2 g. (1.0 mole) of triethyl phosphite during 0.6 hour at 27–43° C. Stirring was continued as the temperature increased spontaneously to 56° C., at which time heating was initiated. The mixture was kept at 120–130° C. for 1.0 hour and then distilled to give 282.2 g. (85.1% yield) of 2-(diethoxyphosphinyloxy)-1-methylpropen-1-yl dimethyl phosphate, B.P. 151° C./0.1 mm., $n_D^{25}$ 1.4388, which analyzed as follows:

|  | Found | Anal. Calcd. $C_{10}H_{22}O_8P_2$ |
|---|---|---|
| Percent C | 36.22 | 36.20 |
| Percent H | 6.66 | 6.66 |
| Percent P | 18.74 | 18.65 |

Example 2

To a reaction vessel containing 226.1 g. (0.875 mole) of 1-chloro-1-methyl-2-oxopropyl diethyl phosphate there was added 145.2 g. (0.875 mole) of triethyl phosphite in 0.5 hour. The mixture was then warmed at 120–130° C. for 1.0 hour. Distillation gave 278.1 g. (88.5% yield) of 2-diethoxyphosphinyloxy-1-methylpropen-1-yl diethyl phosphate, B.P. 150° C./0.1 mm., $n_D^{25}$ 1.4371, which analyzed as follows:

|  | Found | Anal. Calcd. for $C_{12}H_{26}O_8P_2$ |
|---|---|---|
| Percent C | 40.02 | 40.02 |
| Percent H | 7.32 | 7.28 |
| Percent P | 17.36 | 17.20 |

Example 3

A mixture of 28.6 g. (0.1 mole) of 1-chloro-1-methyl-2-oxopropyl diisopropyl phosphate and 13.6 g. (0.11 mole) of trimethyl phosphite was warmed to 110° C., and then distilled to give 12.0 g. of 2-(diisopropoxyphosphinyloxy)-1-methylpropen-1-yl dimethyl phosphate, B.P. 151–152° C./0.4 mm., $n_D^{25}$ 1.4372, which analyzed as follows:

|  | Found | Anal. Calcd. for $C_{12}H_{26}O_8P_2$ |
|---|---|---|
| Percent C | 39.94 | 40.0 |
| Percent H | 7.20 | 7.3 |
| Percent P | 17.08 | 17.2 |

Example 4

To a reaction vessel containing 50.0 g. (0.159 mole) of 1-chloro-1-pentyl-2-oxopropyl diethyl phosphate and its isomeric partner there was added 19.7 g. (0.159 mole) of trimethyl phosphate in 0.1 hour. The mixture was heated at 110–120° C. for 0.5 hour and then at 150–155° C. for another 0.5 hour. Distillation gas 174. g., B.P. 154–161° C./0.05 mm, of an isomeric mixture of 2-(diethoxyphosphinyloxy)-1-methylhepten-1-yl dimethyl phosphate and 2-(diethoxyphosphinyloxy)-1-pentylpropen-1-yl dimethyl phosphate which analyzed as follows:

|  | Found | Anal. Calcd. for $C_{14}H_{30}O_8P_2$ |
|---|---|---|
| Percent C | 43.68 | 43.36 |
| Percent H | 8.03 | 7.79 |
| Percent P | 15.67 | 15.92 |

Example 5

To a reaction vessel containing 27.3 g. (0.105 mole) of 1-chloro-1-methyl-2-oxopropyl diethyl phosphate there was added 21.0 g. (0.105 mole) of diethyl phenylphosphonite dropwise in 0.15 hour. During the addition the temperature increased from 23° C. to 43° C. The mixture was then heated at 110° C.–115° C. for 0.33 hour. Distillation gave 32. g. (78% yield) of 2-(diethoxyphosphinyloxy)-1-methylpropen-1-yl ethyl phenylphosphonate, B.P. 178° C./0.05 mm., which analyzed as follows:

|  | Found | Anal. Calcd. for $C_{10}H_{26}O_7P_2$ |
|---|---|---|
| Percent C | 49.01 | 48.98 |
| Percent H | 6.88 | 6.68 |
| Percent P | 15.53 | 15.78 |

Operating as above, except that ethyl diphenylphosphinite is used, there is obtained as the major product 2-(diethoxyphosphinyloxy)-1-methylpropen-1-yl diphenylphosphinate.

Example 6

A mixture of 20.1 g. (0.077 mole) of 1-chloro-1-methyl-2-oxopropyl diethyl phosphate and 21.0 g. (0.77 mole) of tris(2-chloroethyl) phosphite was stirred and warmed at 120–130° C. for 1.0 hour. Concentration to 120° C./0.9 mm. gave 2-(diethoxyphosphinyloxy) - 1-methylpropen-1-yl bis(2-chloroethyl) phosphate.

Example 7

To an adduct prepared by warming 44.5 g. (0.133 mole) of trihexyl phosphite and 11.4 g. (0.133 mole) of 2,3-butanedione to 85° C. there was added 9.4 g. (0.133 mole) of chlorine while cooling when necessary to maintain the temperature at 30–40° C. The residue was concentrated to 130° C./0.4 mm. to remove the by-product.

To the above prepared 1-chloro-1-methyl-2-oxopropyl dihexyl phosphate there was added 22.8 g. (0.137 mole) of triethyl phosphite dropwise. The mixture was warmed at 110–120° C. for 0.5 hour and then concentrated to 120° C./0.15 mm. to obtain 58.6 g. (93.5% yield) of 2-(dihexyloxyphosphinyloxy)-1-methylpropen-1-yl diethyl phosphate.

Example 8

To a reaction vessel containing 59.4 g. (0.155 mole) of 1-chloro-2-oxo-1,2-diphenylethyl diethyl phosphate in 100 ml. of benzene there was added 25.8 g. (0.155 mole) of redistilled triethyl phosphite. When no exothermic reaction was apparent after ⅓ of the phosphite had been added, the mixture was heated to reflux (85° C.) and the remainder of the phosphite was added at this temperature. The benzene was slowly distilled off, and over a period of 0.5 hour the temperature increased to 130° C. The mixture was heated at 130–138° C. for one hour and then concentrated to a temperature of 100° C./0.5 mm. to give the product as a viscous liquid residue.

What is claimed is:

1. A process which comprises reacting a trivalent phosphorus ester of the formula

wherein R is selected from the group consisting of alkyl and haloalkyl radicals having from one to twelve carbon atoms and Y and Y' each are selected from the group consisting of hydrocarbyl, hydrocarbyloxy, and halohydrocarbyloxy radicals which are free from aliphatic unsaturation and have from one to twelve carbon atoms with an α-halo-β-oxohydrocarbyl phosphorus ester of the formula

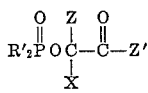

wherein R' is selected from the group consisting of hydrocarbyl, hydrocarbyloxy, halohydrocarbyl, and halohydrocarbyloxy radicals which are free from aliphatic unsaturation and have from one to twelve carbon atoms; X is selected from the group consisting of bromine and chlorine; Z is selected from the group consisting of hydrocarbyl radicals which are free from aliphatic unsaturaation and have from one to twelve carbon atoms, and said hydrocarbyl radicals having alkoxy groups of from one to two carbon atoms and substituents therein, and hydrogen; and recovering from the resulting reaction mixture a compound of the formula

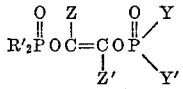

wherein R', Z, Z', Y, and Y' are as defined above.

2. A method which comprises reacting a trialkyl phosphite having from one to twelve carbon atoms in each alkyl radical with a compound of the formula

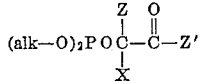

wherein X is selected from the group consisting of chlorine and bromine; Z is selected from the group consisting of hydrocarbyl radicals which are free from aliphatic unsaturation and have from one to twelve carbon atoms, and said hydrocarbyl radicals having alkoxy groups of from one to two carbon atoms and substituents therein; Z' is selected from the group consisting of hydrocarbyl radicals which are free from aliphatic unsaturation and have from one to twelve carbon atoms, said hydrocarbyl radicals having alkoxy groups of from one to two carbon atoms, and substituents therein, and hydrogen; and alk denotes an alkyl radical of from one to twelve carbon atoms, and recovering from the resulting reaction mixture a compound of the formula

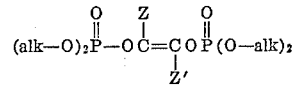

wherein Z, Z', and alk are as defined above.

3. A method which comprises reacting a tris(haloalkyl) phosphite having from one to twelve carbon atoms in each haloalkyl radical with a compound of the formula

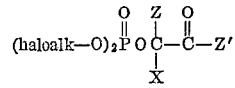

wherein X is selected from the group consisting of chlorine and bromine; Z is selected from the group consisting of hydrocarbyl radicals which are free from aliphatic unsaturation and have from one to twelve carbon atoms, and said hydrocarbyl radicals having alkoxy groups of from one to two carbon atoms and substituents therein; Z' is selected from the group consisting of hydrocarbyl radicals which are free from aliphatic unsaturation and have from one to twelve carbon atoms, said hydrocarbyl radicals having alkoxy groups of from one to two carbon atoms as substituents therein, and hydrogen; and haloalk denotes a halogen substituted alkyl radical having from one to twelve carbon atoms, and recovering from the resulting reaction mixture a compound of the formula

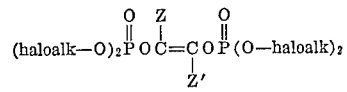

wherein Z, Z', and haloalk are as defined above.

4. The method which comprises reacting triethyl phosphite with 1-chloro-1-methyl-2-oxopropyl dimethyl phosphate and recovering from the resulting reaction mixture 2-(diethoxyphosphinyloxy)-1-methyl-propen-1-yl dimethyl phosphate.

5. A method which comprises reacting triethyl phosphite with 1-chloro-2-oxo-1,2-diphenylethyl diethyl phosphate, and recovering from the resulting reaction mixture 2-(diethoxyphosphinyloxy)-1,2-diphenylethenyl diethyl phosphate.

6. A method which comprises reacting tris-(2-chloroethyl) phosphite with 1-chloro-1-methyl-2-oxopropyl diethyl phosphate and recovering from the resulting reaction mixture 2-(diethoxyphosphinyloxy)-1-methylpropen-1-yl bis(2-chloroethyl) phosphate.

7. A method which comprises reacting diethyl phenylphosphonite with 1-chloro-1-methyl-2-oxopropyl diethyl phosphate and recovering from the resulting reaction mixture 2-(diethoxyphosphinyloxy)-1-methylpropen-1-yl ethyl phenylphosphonate.

8. A method which comprises reacting trimethyl phosphite with an isomeric mixture of 1-chloro-1-pentyl-2-oxopropyl diethyl phosphate and 1-chloro-1-methyl-2-oxoheptenyl diethyl phosphate and recovering from the resulting reaction mixture a product which is an isomeric mixture of 2-(diethoxyphosphinyloxy)-1-pentylpropen-1-yl dimethyl phosphate and its isomer 2-(diethoxyphosphinyloxy)-1-methyl-hepten-1-yl dimethyl phosphate.

No references cited.